Patented Aug. 10, 1954

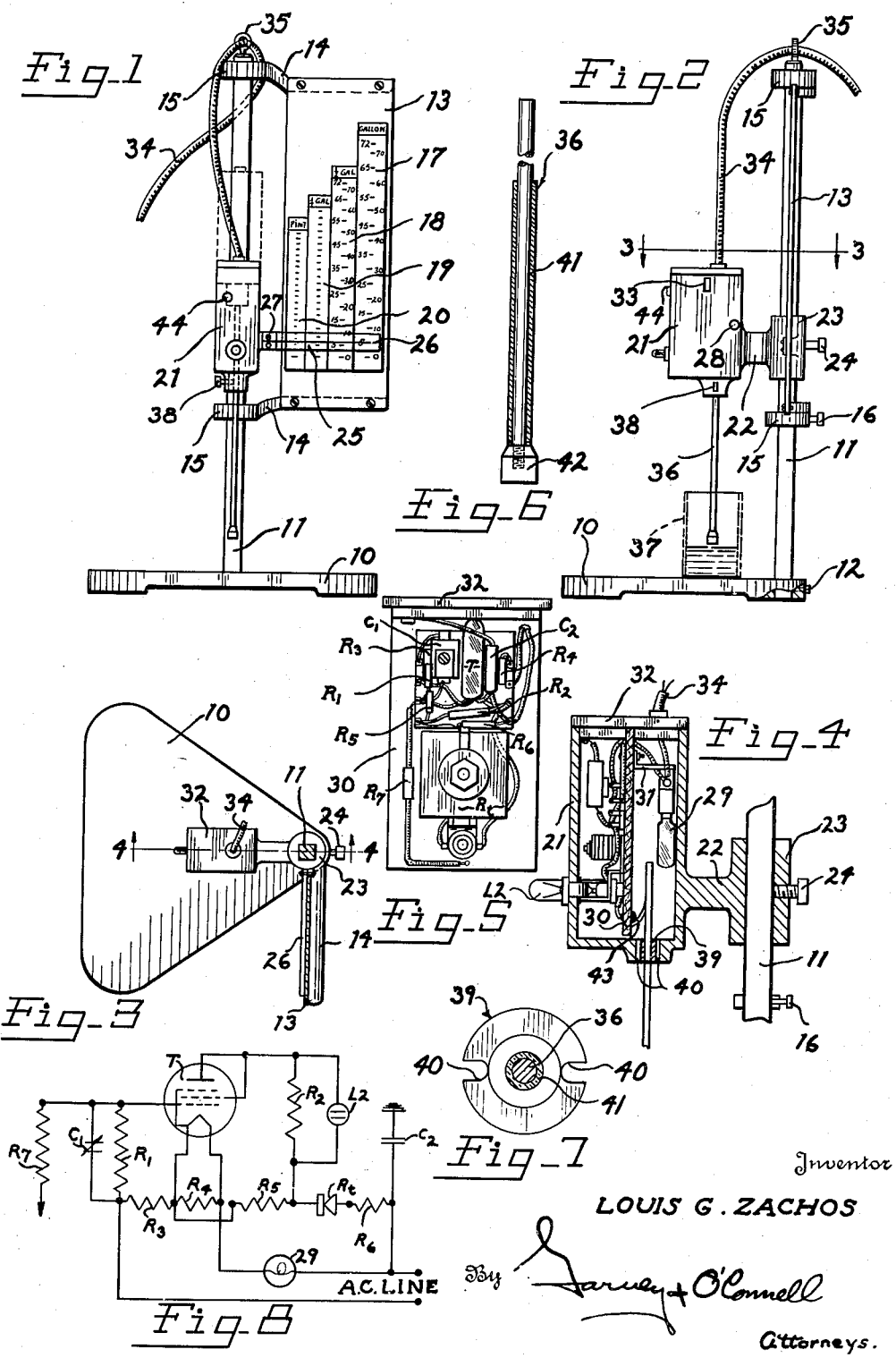

2,685,743

UNITED STATES PATENT OFFICE 2,685,743

DEVICE FOR DETERMINING THE HEIGHT OF THE SURFACE OF LIQUID IN CONTAINERS

Louis George Zachos, Atlanta, Ga.

Application January 23, 1950, Serial No. 140,098

5 Claims. (Cl. 33—126.7)

This invention relates to the art of mixing different colors of paints, lacquers, enamels, inks and like pigment bearing liquids, for the purpose of obtaining a desired shade or density of color, by what are commonly known as proportional mixing devices.

These so-called proportional mixing devices are not without certain well-known and recognized disadvantages. This may be exemplified by reference to those forms of mixing devices now generally employed and which have in common with one another a light transmitting element suspended for vertical adjustment to extend into a receptacle, and, in association with a concealed source of light, a scale and an index readable against the scale graduations, enables the user to obtain an ultimate mixture made up of accurately measured predetermined amounts of the constituents used. In operation the light rays from the concealed source of light are transmitted to the lower end of the light transmitting element, and when the liquid being poured into the receptacle closely approaches the lower end of the light transmitting element the light rays are shut off, and the user knows that he has in the receptacle the desired and requisite amount of that constituent.

The proportional mixing device disclosed and claimed in Patent No. 2,326,111 granted to me under date of August 10, 1943, is an improvement over the mixing devices referred to generally in the preceding paragraph. In that patent the light transmitting element is in the form of a rod of "Lucite" or other transparent substance. When the liquid rises to a point closely approaching the lower end of the rod so as to practically contact therewith, the light rays from the rod, instead of being reflected back into the rod as in the case of the aforementioned prior devices, flicker or spread over the top surface of the liquid. As a consequence the surface of the liquid is illuminated at all times thereby enabling the user to constantly observe the distance between the rising liquid level and the lower end of the rod. In addition, the flickering of the light rays provides a preliminary or warning signal to the user that the liquid is approaching the desired level, the intensity of the flickering of the light rays increasing as the liquid level approaches the lower end of the rod. Thus, with my patented device the probability of the user accidentally pouring too much liquid so that the level thereof rises into undesirable contact with the light transmitting rod is reduced to a minimum.

The employment of a light transmitting element functioning in the desired manner of that disclosed in my aforementioned patented mixing device requires constant peering into the mixing receptacle, and the flickering of the light rays over the surface of the liquid has undesired effects. Thus a more stable and constant illumination of the interior of the mixing receptacle and a more positively acting signal indicating the approach of the rising liquid to the required level are highly desirable to minimize the strain and tension on the user and at the same time insure better control of the pouring and greater accuracy in measuring out the desired proportion of each constituent in the final liquid mixture, and the present invention has among its objects to afford control of the pouring and greater accuracy in measuring the desired proportion of the liquid constituent.

More specifically an object of this invention is to provide an electronic signal device for use with a proportional mixing device particularly of the character disclosed in my aforementioned patent and in lieu of the light transmitting element thereof for positively and visually indicating in proper sequence both the near and final approach of the poured liquid to a predetermined level within the mixing receptacle.

Another object of the invention is to provide an electronic signal device which, when used in the manner and for the purpose above stated, will additionally function to provide desired illumination within the mixing receptacle without in anywise detracting from the effective illumination of the scale and index which is characteristic of my patented proportional mixing device.

Another object of the invention is to provide a proportional mixing device which will have all the advantages of those which employ a light transmitting element without any of the disadvantages thereof.

Generally the objects of the invention are accomplished by the provision of a suitable electric signal element controlled by the plate circuit of an electronic tube, the grid circuit of which includes a sensing element which is responsive to the rise in the level of the liquid being measured for effecting changes in grid bias of the tube to thereby control the supply of current to the signal element. As the level of the liquid progressively approaches the sensing element the supply of current is proportionately increased and consequently the signal element progressively energized.

The invention, together with its objects and advantages, will be best understood when the following detailed description thereof is read with reference to the accompanying drawing in which is illustrated what is presently considered a preferred embodiment of the invention, and wherein:

Figure 1 is a front elevational view of a proportional mixing device embodying the features of this invention;

Figure 2 is a side elevational view thereof;

Figure 3 is a fragmentary horizontal sectional view taken substantially on the line 3—3 of Figure 2 and looking downwardly;

Figure 4 is a fragmentary vertical sectional view taken substantially on the line 4—4 of Figure 3 and looking in the direction of the arrows;

Figure 5 is a front elevational view of a partition panel and removable top plate hereinafter more fully referred to;

Figure 6 is an elevational view of a sensing element forming part of the invention, the dielectric surface thereof being shown in section;

Figure 7 is a transverse sectional view through the sensing element, the same being shown in association with a disc shaped holder, the latter being shown in top plan, and Figure 8 is an electro-diagrammatic view illustrating the circuit connections of the electronic signal device constituting a salient feature of this invention.

Referring now in detail to the drawings, it will be seen that 10 indicates a base, preferably formed of an aluminum casting triangular in shape. A standard 11, preferably square in cross section, has a lower end detachably secured to the base, said end of the standard being accommodated within an opening provided at the rear apex of the base, and secured therein in any suitable manner, as by a set screw 12.

A scale plate 13 is disposed at one side of the standard 11 and is supported thereby at the desired position of vertical adjustment through the medium of supporting brackets 14 provided with eyes 15 sleeved on the standard 11 and anchored in position thereon by set screws or similar fastening elements 16. This scale plate 13 is provided with parallel vertically arranged scale columns 17, 18, 19 and 20, designated "Gallon," "½ Gal.," "¼ Gal." and "Pint," respectively. In this connection it will be understood that any desired type of scale or designation may be employed without departing from the spirit of the invention.

A housing 21 of any suitable shape and design is supported by the standard 11 and adjustable vertically relative thereto through the medium of a bracket 22 provided with a sleeve 23 embracing the standard 11. The sleeve 23 is slidable on the standard 11 and is secured at the desired position of adjustment through the medium of a set screw 24 carried thereby and engageable with the standard 11 for securing the sleeve thereon in selected set position.

An index 25 is carried by the bracket arm 22 and extends laterally therefrom to be read against the graduations of the several previously mentioned scale columns. The index 25 is preferably made of Lucite or a similar plastic substance, and is provided with a central longitudinal gauge line 26 which is adapted to register with a selected graduation on one of the scale columns on the plate 13 when moved to an overlying position. The gauge line 26 is preferably red to distinguish from the scale markers which are preferably black. The index 25 is secured to the bracket arm 22 in any suitable manner and as indicated generally at 27.

Housing 21 is provided with an appropriately located opening 28 (see Figure 2) through which light rays from a bulb 29 (see Figure 4) are directed towards the scale plate 13 and index 25 to facilitate the reading of the index against the graduations of the scale columns 17, 18, 19 and 20.

The light bulb 29 is suspended within the housing 21 by a suitable socket supported from a partition panel 30 through the medium of a bracket 31. The panel 30 extends into the housing 21 from a top or cap member 32 provided for said housing. The cap 32 is preferably locked in position by means of a set screw 33 carried by the housing 21. A cord 34, connected with the socket for the bulb 29, extends out through the cap 32 and through a guiding eye 35 at the top of the standard 11 to suspend the cord in a convenient position and permit the housing to be easily moved up and down. A plug (not shown) is carried by the outer end of the cord 34 to facilitate the attachment of the device to the conventional electrical outlet or receptacle.

The proportional mixing device of this invention is distinguished from the proportional mixing devices of the prior art, including that disclosed in my aforementioned patent, by the provision of a sensing element 36 depending from the housing 21 so that its lower end may be lowered into a receptacle resting on the base 10 (see Figure 2). The sensing element 36 may be adjusted vertically at will relative to the housing 21, the rod being frictionally held in position by a fibre set screw 38 carried by the housing 21 and adapted to frictionally bear against the rod for holding the latter at the desired position of adjustment. The sensing element extends into the housing 21 through a suitable flanged opening provided in the bottom of the housing. Arranged within this opening is a disc-like bushing 39 which is provided with a radial aperture to accommodate the aforementioned set screw 38. The bushing 39 is preferably in the form of a disc of "Lucite" or a similar plastic substance and is centrally apertured to accommodate the sensing element 36. Also to insure sufficient light rays from the bulb 29 being directed downwardly to illuminate the surface of the liquid within the receptacle 37, bushing 39 is provided with peripheral notches 40 (see Figures 4 and 7).

The sensing element 36 forms part of an electronic signal assembly constituting a salient feature of the invention. To that end the sensing element 36 is in the form of a metal rod, the surface of which for the greater portion of its length is shielded by the application thereto of a suitable insulating material 41, as shown to advantage in Figure 6. Also, preferably the lower or unshielded end of the rod is provided with a removable tip 42 of metal that is screw threaded onto the end of the rod, as shown.

The aforementioned partition panel 30 which is formed of fiber board or other suitable non-conductive material provides a support within the housing 21 for the remaining elements of the referred to electronic signal assembly. As clearly shown in Figures 4 and 5 and in the electro-diagrammatic view, Figure 8, this assembly comprises a vacuum tube T that is supplied with D. C. voltage by a rectifier $R_t$ and its network of resistors $R6$, $R5$ and $R3$. The filament of vacuum tube T is supplied from the line voltage through the aforementioned illuminating lamp 29, which also serves in the circuit as a ballast. This lamp has a regulating effect peculiar to all tungsten lamps which tends to hold the filament voltage at a constant value over a limited range and thereby stabilize the circuit action. A resistor R4 is shunted across the filament to bring the total current drain to a value sufficiently high to light the lamp 29 to approximately 80% of its full brilliance. This lamp is used as previously mentioned to illuminate the scale, index and surface of the liquid being measured. Condensers C1 and C2 and resistor R1 are associated with the control grid circuit of the vacuum tube T while resistor R2 and lamp L2 are associated with the anode circuit. R7 is a protective resistor.

The circuit is so arranged that vacuum tube T is operating on that portion of its plate current characteristic for which very little plate current is flowing. This is accomplished by applying the proper amount of D. C. bias together with a small amount of A. C. signal in the proper phase relation to the control grid of tube T. Condenser C2 is so arranged in the circuit that the chassis of the indicating unit is at ground potential with relation to the grid circuit. A signal lamp L2 is operated by the voltage drop across plate resistance R2 produced by the increase in plate current of tube T when the grid bias of tube T is altered in the proper, i. e. positive direction. This signal lamp is disposed exteriorly of the housing 21 and is supported by a suitable socket mounted on the partition panel 30 arranged in alignment with an opening provided in the front wall of the housing 21 and through which opening the lamp is readily engaged with its mentioned socket. Thus it will be seen that this lamp is at all times visible to the user. It will also be apparent that instead of employing a visual signal element such as this lamp L2, any suitable electrically operated audible signal element may be employed without departing from the spirit of the invention.

Also connected in the circuit and, as shown in Figure 4, supported by the panel 30, is a spring contact 43 which impinges against the upper, non-shielded end of the sensing element 36. Access to the variable condenser C1 may be had through an opening provided in housing 21 and normally closed by a plug 44.

From the foregoing description of the electronic signal assembly it should be apparent that the aforementioned change in control grid bias is effected by bringing the sensing element 36 closer to ground, i. e. closer to the liquid being measured. As the sensing element 36 comes in close proximity to the liquid, a voltage drop occurs through resistors R1 and R7 and condenser C1. Since resistor R1 is of much higher resistance than R7, most of this voltage change takes place across R1 and this voltage being of the proper phase to drive the control grid positive causes an increase in plate current of vacuum tube T. This increase in plate current increases the voltage drop across anode resistor R2 to such a value that the lamp L2 glows dimly. When the sensing element actually contacts the liquid, the plate current and consequently the voltage drop across anode resistor R2 increase and the lamp L2 is more brightly lit. This lamp remains lit until the sensing element is removed from the surface of the liquid.

The method of procedure in using this invention may be briefly stated as follows:

In order to properly set the device after the parts have been assembled in the manner above indicated, a receptacle is positioned on the base 10. The housing 21 is then adjusted vertically upon the standard 11 to register the index 25 with the selected graduation of the appropriate scale column on the scale plate 13, after which the housing and the index carried thereby is secured at the proper set position by tightening the set screw 24. By reading the gauge line 26 of the index against the proper graduation on the selected scale the position of the lower end of sensing element 36 within the receptacle 37 is readily determined. The rays from the lamp 29 passing through the opening 28 illuminate the scale and index to facilitate the reading thereof while the light rays from the lamp passing downwardly through the bushing 39 and notches 40 thereof will provide sufficient and desired illumination within the receptacle 37 and over the surface of the liquid as it is being poured into the receptacle.

When the above-mentioned adjustments have been made the liquid, such as lacquer, paint, pigment bearing liquid or non-pigmented liquid, is poured into the container. As the level of the liquid rises in the container, the lower end of the sensing element 36 is gradually brought into ground potential with relation to the level of the liquid. As previously stated, as the liquid level rises into close proximity to the lower end of the sensing element 36, sufficient current is caused to flow to the signal lamp L2 to cause the latter to first glow dimly. The supply of current to the signal lamp is constantly increased as the level of the liquid approaches the lower end of the sensing element 36 until the level of the liquid comes into contact with the lower end of the sensing element, at which time the lamp L2 glows very brightly thus signalling the fact that the desired amount of liquid has been poured into the receptacle. Thus with this device the lamp L2 serves as a preliminary warning signal to indicate that the liquid level is approaching the maximum desired and also as an indicator for effectively indicating immediately when that maximum amount of the liquid has been reached.

Through the medium of the present invention, paint, lacquer and the like, may be fixed in proper proportions to obtain a desired shade or density of color, and a duplication of such shade and color even though the mixture is made up at different times, with greater convenience and more accurately than has heretofore been the case.

While the invention has been described in detail in its presently preferred embodiment, it will, of course, be understood that such has been done for purposes of illustration only and not by way of limitation, and therefore only such limitations are to be imposed thereon as may reasonably come within the scope of the appended claims.

What I claim is:

1. A device for determining the height of the surface of a liquid in a receptacle, comprising a base adapted to support a receptacle, a vertical standard mounted upon the base in offset relation with respect to a receptacle supported by the base, a scale supported upon the standard and laterally thereof, a housing slideably supported upon the standard forwardly and laterally of the scale, means for securing the housing in a set position upon the standard, a transparent laterally extending index mounted for movement with the housing and overlying the scale, a shielded metal rod depending from the housing adapted to extend into a receptacle for contact with liquid poured into the receptacle, an illuminating lamp mounted within said housing, said housing having openings for directing rays of light upon the scale and upon the surface of the liquid within the receptacle whereby the scale and surface of the liquid are continuously illuminated during use of the device, and an electronic mechanism within said housing in electrical circuit with said lamp and said metal rod and including a signal lamp mounted substantially exteriorly of the housing, said electronic mechanism being responsive to the approach of the level of liquid in the receptacle toward the lower end of said rod for supplying current to the signal lamp to cause the latter to first glow dimly and then to full brightness as the liquid level rises from a point slightly below the lower end of the rod into contact with said end of the rod.

2. A device for determining the height of the surface of a liquid in a receptacle, comprising a base adapted to support a receptacle, a vertical standard mounted upon the base in offset relation with respect to a receptacle supported by the base, a scale supported upon the standard and laterally thereof, a housing slidably supported upon the standard forwardly and laterally of the scale, means for securing the housing in a set position upon the standard, a transparent laterally extending index mounted for movement with the housing and overlying the scale, a shielded metal rod depending from the housing adapted to extend into a receptacle for contact with liquid poured into the receptacle, an illuminating lamp mounted within said housing, said housing having openings for directing rays of light upon the scale and upon the surface of the liquid within the receptacle whereby the scale and surface of the liquid are continuously illuminated during use of the device, and an electronic mechanism within the housing and including an electronic tube having its filament energized from the source of electrical service, the aforesaid lamp being in circuit with the filament to hold the filament voltage at a constant value and stabilize the circuit action, a signal lamp mounted substantially exteriorly of the housing and included in the plate circuit of said electronic tube, means for applying a D. C. voltage to the grid of said electronic tube, line energized means for impressing a signal voltage on said grid of said tube, and a circuit including the aforesaid depending metal rod connected to said grid for driving the grid positive when the rod approaches and contacts the liquid to allow the plate circuit to pass sufficient current to illuminate the signal lamp.

3. A device for determining the height of the surface of a liquid in a receptacle, comprising a base for supporting a receptacle, a vertical standard mounted upon the base in offset relation with the latter, a scale supported on the standard laterally thereof, a housing slidably supported upon the standard forwardly and laterally of the scale, a sensing rod depending from the housing to enter a receptacle mounted on the base, the housing having openings laterally and around the sensing rod, and an electronic apparatus including an electronic tube, a plate circuit and a grid circuit, a signal lamp mounted on the front of the housing and included in the plate circuit of the electronic tube, a ballast lamp serially included in the filament circuit of the electronic tube to hold the filament voltage at a constant value and stabilize the circuit action, the ballast lamp being enclosed in and positioned to project light rays through the aforesaid openings in said housing, means for applying a D. C. voltage to the grid of said tube, line energized means for imposing a signal voltage on said grid, and a circuit electrically connected to the grid of said tube and including the sensing element, the base and the supported receptacle, whereby upon approach of the liquid level to said sensing element said circuit will drive the grid positive and enable the plate circuit to supply sufficient current to illuminate said signal lamp.

4. A device for determining the height of the surface of a liquid in a receptacle which comprises a base, a housing for vertical adjustment on said base, a scale laterally of the housing, a sensing rod pendent from the lower end of the housing, and an electronic signalling mechanism enclosed by the housing and including an electronic tube and grid and plate circuits therefor, line energized means for activating the filament of said tube and its grid and plate circuits, a rectifier in the grid circuit to impose a positive bias on the grid, line energized means for imposing a signal voltage on said grid, a circuit including the sensing element and one side of the service line electrically engaged with said grid, the said base and receptacle being included in said circuit, a signal lamp in the plate circuit, and a ballast lamp in the filament circuit of the tube, the ballast lamp being positioned to direct light rays on said sensing element and said scale, the sensing element, when approaching and in contact with the contents of the receptacle, driving the grid positive, thus leaving the plate circuit active sufficiently to illuminate the signal lamp.

5. A device for determining the height of the surface of a liquid in a receptacle which comprises a base, a housing for vertical adjustment on said base, a scale laterally of the housing, a sensing rod pendent from the lower end of the housing, and an electronic signalling mechanism enclosed by the housing and including an electronic tube and grid and plate circuits therefor, line energized means for activating the filament of said tube and its grid and plate circuits, a rectifier in the grid circuit to impose a positive bias on the grid, line energized means for imposing a signal voltage on said grid, a circuit including the sensing element and one side of the service line connected to said grid, the said base and receptacle being included in said circuit, and a signal lamp in the plate circuit, the sensing element, when approaching and in contact with the contents of the receptacle, driving the grid positive to leave the plate circuit active sufficiently to illuminate the signal lamp.

References Cited in the file of this patent

UNITED STATES PATENTS

| Number | Name | Date |
| --- | --- | --- |
| 2,032,016 | Hitner | Feb. 25, 1936 |
| 2,326,111 | Zachos | Aug. 10, 1943 |
| 2,476,674 | McCauley | July 19, 1949 |

FOREIGN PATENTS

| Number | Country | Date |
| --- | --- | --- |
| 398,065 | Great Britain | Sept. 7, 1933 |